US012744856B2

(12) United States Patent
Takahashi

(10) Patent No.: US 12,744,856 B2
(45) Date of Patent: Sep. 22, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Toru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/455,644

(22) Filed: Aug. 25, 2023

(65) Prior Publication Data

US 2024/0323299 A1 Sep. 26, 2024

(30) Foreign Application Priority Data

Mar. 23, 2023 (JP) ................................ 2023-046339

(51) Int. Cl.
*H04N 1/32* (2006.01)

(52) U.S. Cl.
CPC ............................... *H04N 1/32358* (2013.01)

(58) Field of Classification Search
CPC .................................................. H04N 1/32358
USPC ........................................................ 358/1.16
See application file for complete search history.

(56) References Cited

FOREIGN PATENT DOCUMENTS

| | | | | |
|---|---|---|---|---|
| JP | 2001283027 | A | * | 10/2001 |
| JP | 2005025323 | A | * | 1/2005 |
| JP | 2017135561 | | | 8/2017 |

* cited by examiner

*Primary Examiner* — Charlotte M Baker
(74) *Attorney, Agent, or Firm* — JCIPRNET

(57) ABSTRACT

An information processing apparatus includes a processor configured to: transmit information to a storage destination when received image data is transferred to the storage destination where the image data is stored, the information indicating a storage location corresponding to a person-in-charge responsible for processing the image data; and transmit a command to the storage destination if information allowing the image data transferred to the storage location to be distinguishable between unprocessed image data as image data that has not been processed and processed image data as image data that has been processed is acquired, the command indicating that at least one of the unprocessed image data and the processed image data is to be moved to a second storage location.

13 Claims, 8 Drawing Sheets

USER
300
310
200
200A
200B
190
RECEPTION IMAGE DATA
100A
100B
132
100
FACSIMILE RECEPTION
400

FIG. 2

100A, 200A
11
11b
RAM
11a
CPU
12
SECONDARY STORAGE UNIT
11c
ROM
11e
INTERFACE UNIT
11d
NONVOLATILE MEMORY 100
100A
101
INFORMATION ACQUISITION UNIT
102
TRANSMISSION CONTROL UNIT
103
DISPLAY CONTROL UNIT
100B
100C
BOX
RECEPTION IMAGE DATA
200
200A
200B
2
4
CURRENT-DAY FOLDER
5
FOLLOWING-DAY FOLDER
3
4
CURRENT-DAY FOLDER
5
FOLLOWING-DAY FOLDER

FIG. 8

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-046339 filed Mar. 23, 2023.

BACKGROUND

(i) Technical Field

The present disclosure relates to information processing apparatuses, information processing methods, and non-transitory computer readable media.

(ii) Related Art

For example, Japanese Unexamined Patent Application Publication No. 2017-135561 discloses a configuration in which, when image data received by a facsimile receiver is to be transferred in accordance with a predetermined condition, a folder serving as a transfer destination is determined by referring to information about the image data, and a folder name of the folder is set as three hierarchical layers including a hierarchical layer of, for example, a date.

SUMMARY

When the received image data is transferred to a storage destination where the image data is stored, and is stored at a predetermined storage location, it is conceivable that a person-in-charge performs a process on the stored image data. If the number of items of image data assigned to the person-in-charge increases to an extent that, for example, the person-in-charge has to work overtime due to a difficulty in performing the process within normal business hours, the workload of the person-in-charge increases. On the other hand, for example, when a manual operation has to be performed for moving unprocessed image data to a second storage location to process the unprocessed image data on the following day, if the operation is troublesome or if an operational error occurs, it is possible that the person-in-charge may deal with the unprocessed image data overtime rather than dealing with the unprocessed image data on the following day by a manual operation, thus making it difficult to reduce the workload.

Aspects of non-limiting embodiments of the present disclosure relate to reducing the workload of a person-in-charge who processes image data, as compared with a case where a manual operation is performed for dealing with unprocessed image data on the following day.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: transmit information to a storage destination when received image data is transferred to the storage destination where the image data is stored, the information indicating a storage location corresponding to a person-in-charge responsible for processing the image data; and transmit a command to the storage destination if information allowing the image data transferred to the storage location to be distinguishable between unprocessed image data as image data that has not been processed and processed image data as image data that has been processed is acquired, the command indicating that at least one of the unprocessed image data and the processed image data is to be moved to a second storage location.

BRIEF DESCRIPTION OF THE DRAWINGS

An exemplary embodiment of the present disclosure will be described in detail based on the following figures, wherein:

FIG. 2 illustrates a hardware configuration example of an information processing unit provided in an image forming apparatus and an information processing unit provided in a server apparatus;

FIG. 8 illustrates a specific example according to this exemplary embodiment.

DETAILED DESCRIPTION

An exemplary embodiment of the present disclosure will be described below with reference to the drawings.

Figure 1:
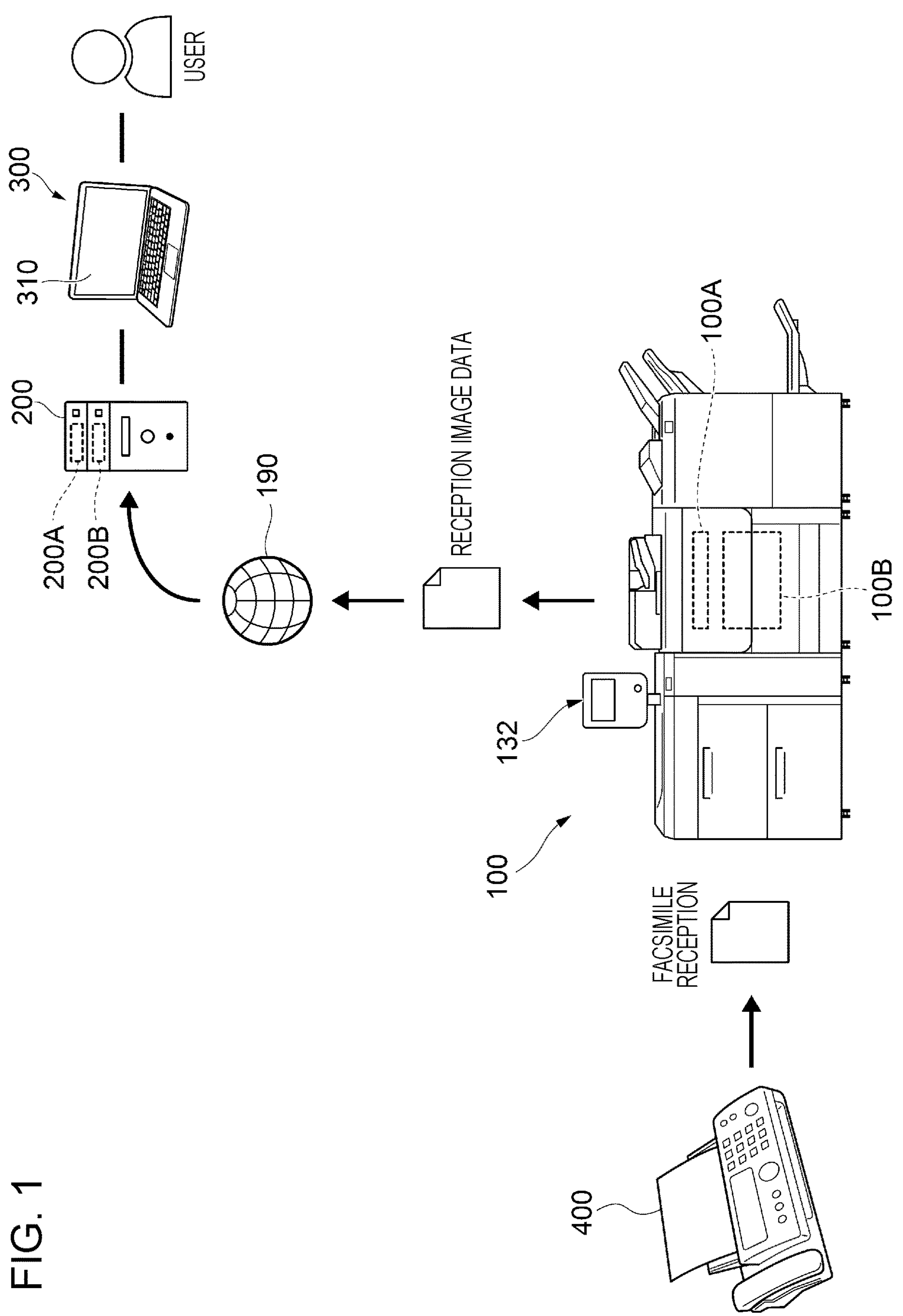
FIG. 1 illustrates an example of an image management system.

FIG. 1 illustrates an example of an image management system 1.

The image management system 1 according to this exemplary embodiment is provided with an image forming apparatus 100 having various functions, such as a copying function, a printing function, a facsimile function, and a scanning function, and a server apparatus 200 connected to the image forming apparatus 100 by a communication line 190. In this exemplary embodiment, the image forming apparatus 100 as an example of an information processing apparatus manages an image received by facsimile. The image is saved in a confidential box included in the image forming apparatus 100, or is transferred to the server apparatus 200 and is managed by being stored at a corresponding storage location. With regard to the image data, the transfer source is the image forming apparatus 100, and the transfer destination is the server apparatus 200.

Furthermore, the image management system 1 according to this exemplary embodiment is provided with a user terminal 300 that is connectable to the server apparatus 200 and that receives an operation from a user.

Although a single user terminal 300 is displayed in FIG. 1, multiple user terminals 300 may be provided.

The image forming apparatus 100 is provided with an information processing unit 100A. The information processing unit 100A executes various processes with respect to the image forming apparatus 100. For example, when the image forming apparatus 100 receives image data from a facsimile apparatus 400, the image forming apparatus 100 performs a predetermined process.

The image forming apparatus 100 is also provided with a storage device 100B that stores data. The storage device 100B stores data, such as reception image data received by facsimile or print data to be printed, and may be used as a box, such as a confidential box, created by software. The storage device 100B is realized with, for example, a hard disk drive (HDD). The reception image data is an example of image data.

The image forming apparatus 100 is provided with an image forming unit that forms an image on a sheet as an example of a recording medium by using, for example, the inkjet method or the electrophotography method.

The server apparatus 200 is provided with an information processing unit 200A that executes various processes. The information processing unit 200A executes various processes with respect to the server apparatus 200.

The server apparatus 200 is provided with a storage device 200B that stores data. The storage device 200B may include multiple folders for storing data transferred from the image forming apparatus 100. The folders are created based on a command from the user terminal 300 or a creation request from the information processing unit 200A, and are managed.

The storage device 200B is realized with, for example, an HDD.

The user terminal 300 is provided with a display device 310. The display device 310 is capable of displaying data stored in the storage device 200B of the server apparatus 200.

The user terminal 300 is realized with a computer. Examples of the user terminal 300 include a personal computer (PC), a smartphone, and a tablet terminal.

Figure 2:
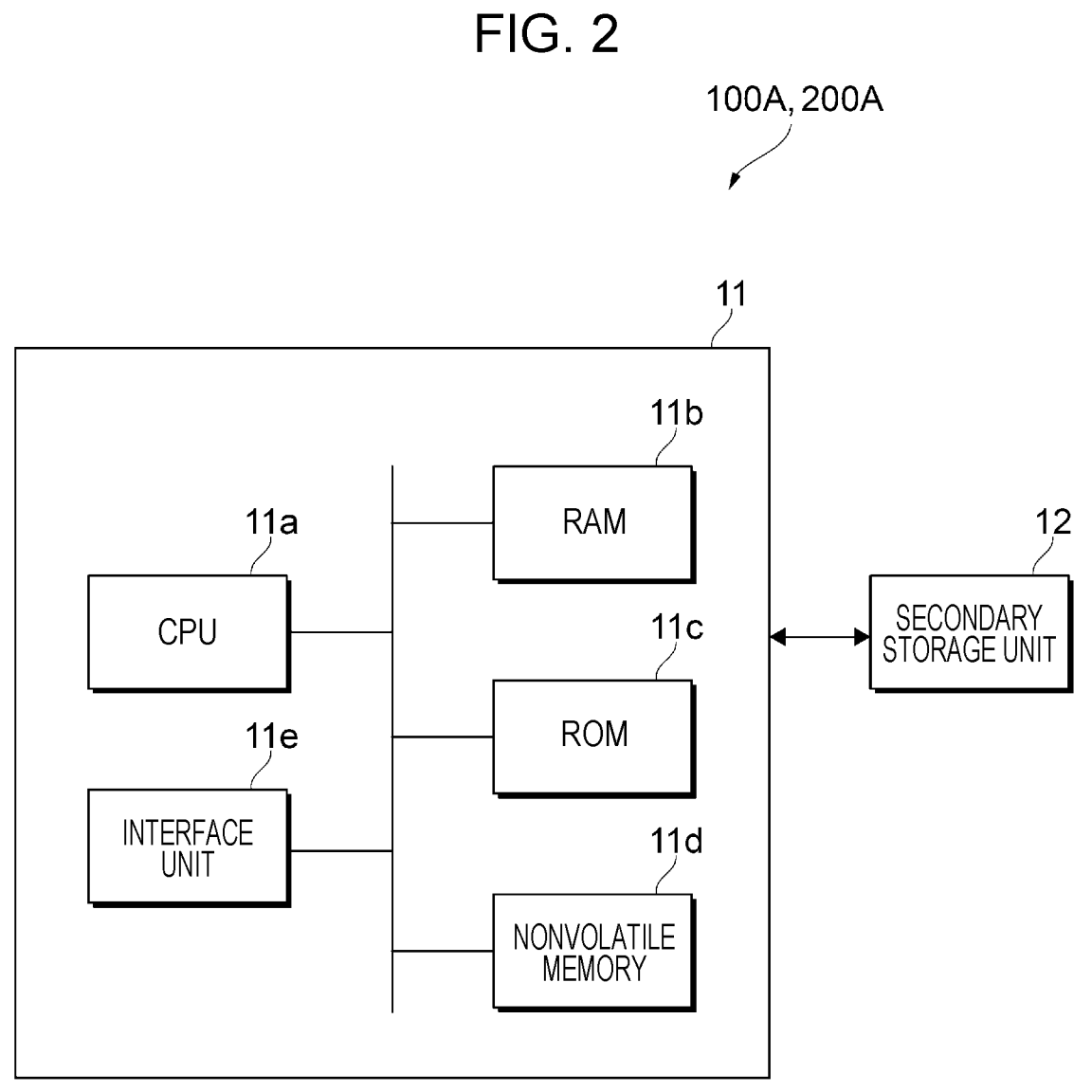

FIG. 2 illustrates a hardware configuration example of the information processing unit 100A provided in the image forming apparatus 100 and the information processing unit 200A provided in the server apparatus 200. Each of the information processing units 100A and 200A is realized with a computer.

Each of the image forming apparatus 100 and the server apparatus 200 has an arithmetic processing unit 11 that executes a digital arithmetic process in accordance with a program, and a secondary storage unit 12 that stores information.

The secondary storage unit 12 is realized with an existing information storage device, such as an HDD, a semiconductor memory, or magnetic tape.

The arithmetic processing unit 11 is provided with a central processing unit (CPU) 11*a* as an example of a processor.

The arithmetic processing unit 11 is also provided with a random access memory (RAM) 11*b* used as a working memory for the CPU 11*a* and a read-only memory (ROM) 11*c* that stores a program to be executed by the CPU 11*a*.

The arithmetic processing unit 11 is further provided with a rewritable nonvolatile memory 11*d* capable of retaining data even when not supplied with electric power, and an interface unit 11*e* that controls each unit, such as a communication unit, connected to the arithmetic processing unit 11.

The nonvolatile memory 11*d* is constituted of, for example, a static random access memory (SRAM) or a flash memory backed up by a battery. In addition to a file, the secondary storage unit 12 stores a program to be executed by the arithmetic processing unit 11.

In this exemplary embodiment, the arithmetic processing unit 11 reads the programs stored in the ROM 11*c* and the secondary storage unit 12 so as to execute various processes.

The program to be executed by the CPU 11*a* may be provided to the information processing units 100A and 200A by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the program to be executed by the CPU 11*a* may be provided to the information processing units 100A and 200A by using a communication unit, such as the Internet.

In this description, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in this exemplary embodiment, and may be changed.

Of processes to be described below, a process to be performed by the image forming apparatus 100 is performed by the CPU 11*a* as an example of a processor provided in the image forming apparatus 100.

Furthermore, of the processes to be described below, a process to be performed by the server apparatus 200 is performed by the CPU 11*a* as an example of a processor provided in the server apparatus 200.

An information processing system constituted of the image forming apparatus 100 may be realized with a single apparatus, such as a single image forming apparatus 100, or may be realized with multiple apparatuses.

Figure 3:
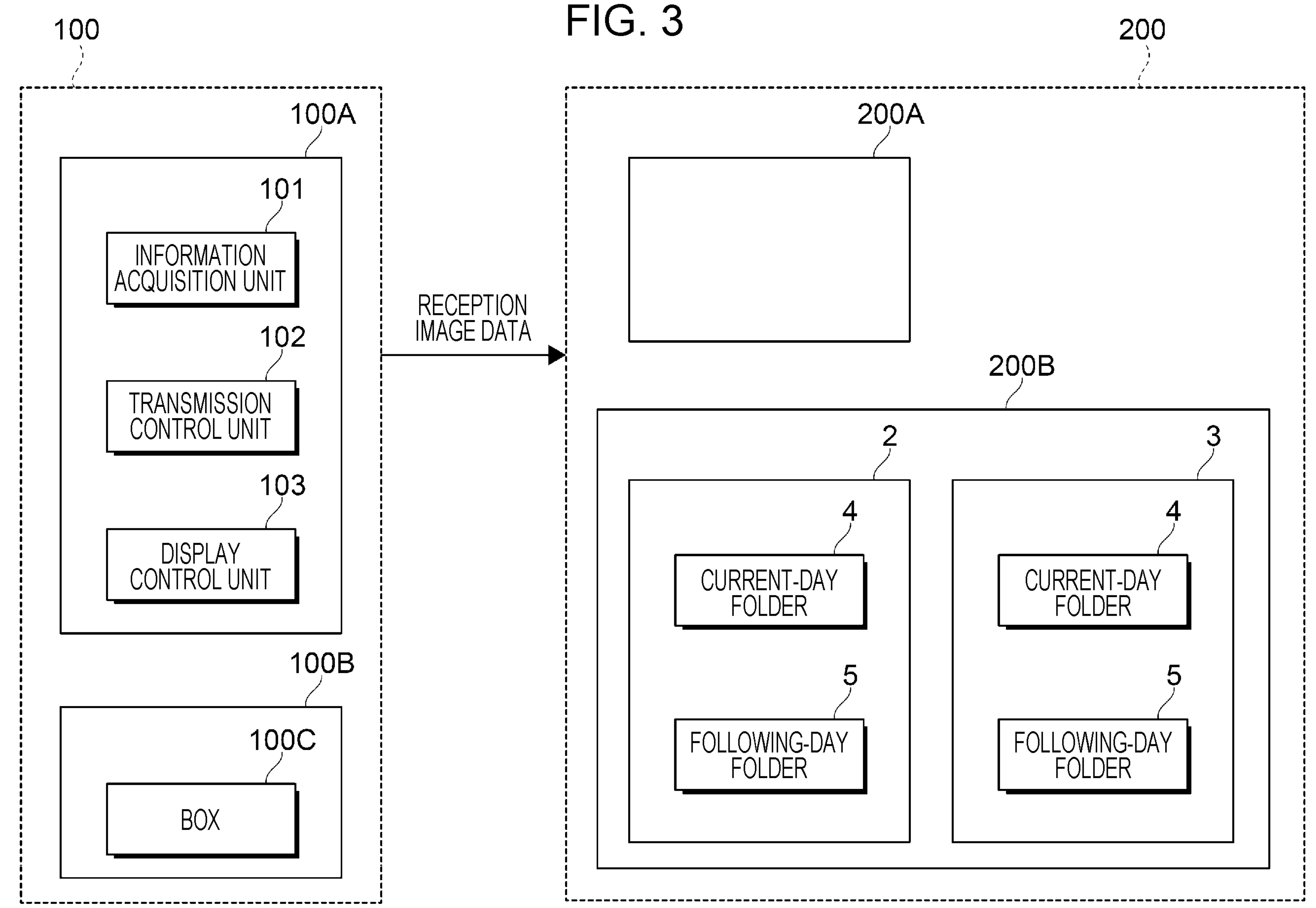
FIG. 3 is a block diagram illustrating a functional configuration of the image forming apparatus and the server apparatus.

FIG. 3 is a block diagram illustrating a functional configuration of the image forming apparatus 100 and the server apparatus 200.

As shown in FIG. 3, the information processing unit 100A of the image forming apparatus 100 has an information acquisition unit 101, a transmission control unit 102, and a display control unit 103.

The information acquisition unit 101 acquires various types of information, such as the reception image data and information about the reception time. The information acquisition unit 101 performs various processes related to the reception image data by using the acquired information.

The information acquisition unit 101 acquires information from the server apparatus 200 and the user terminal 300.

The transmission control unit 102 performs control for transmitting the various types of information acquired by the information acquisition unit 101 and results of the aforementioned processes to the server apparatus 200.

The display control unit 103 performs display control of the display device 310 of the user terminal 300 with respect to the server apparatus 200. The content of the display control is transmitted to the server apparatus 200 by the transmission control unit 102.

As shown in FIG. 3, the storage device 100B of the image forming apparatus 100 includes a box 100C including the aforementioned confidential box. For example, the reception image data is stored in the box 100C.

The storage device 200B of the server apparatus 200 has multiple folders. The multiple folders are created by the information processing unit 200A in response to a request from the image forming apparatus 100. For example, the multiple folders may include a folder for every date and a folder for every person-in-charge as a user of the user terminal 300.

The storage device 200B has the multiple folders created by the information processing unit 200A. The multiple folders may include a person-in-charge folder as a folder created for every person-in-charge and a date folder as a folder created for every date.

For example, the reception image data (see FIG. 1) is stored in a person-in-charge folder of a person-in-charge assigned in accordance with a predetermined condition. In this case, a date folder may be created in the person-in-charge folder and be used as a date folder for every reception date as the date of facsimile reception. The reception date may conceivably be included as a folder name of the date folder.

In this exemplary embodiment, as shown in FIG. 3, the storage device 200B has a first folder 2 and a second folder 3 as person-in-charge folders, and also has current-day folders 4 and following-day folders 5 as date folders.

The first folder 2 is a folder used by a person-in-charge T01 among multiple persons-in-charge, and has stored therein reception image data assigned to the person-in-charge T01. The second folder 3 is a folder used by a person-in-charge T02 different from the person-in-charge T01, and has stored therein reception image data assigned to the person-in-charge T02.

Of the date folders mentioned above, each current-day folder 4 is a date folder of the current day and includes the reception date of the current day with reference to a certain day in a folder name.

Each following-day folder 5 is a date folder of the following day and includes the reception date of the following day in a folder name.

As an alternative to this exemplary embodiment in which each of the first folder 2 and the second folder 3 includes a current-day folder 4 and a following-day folder 5, each of the first folder 2 and the second folder 3 may include a current-day folder 4 alone. If not including a following-day folder 5, each of the first folder 2 and the second folder 3 may include a folder for another purpose in place of the following-day folder 5.

In this exemplary embodiment, as shown in FIG. 3, the first folder 2 is provided with a current-day folder 4 and a following-day folder 5, and the second folder 3 is provided with a current-day folder 4 and a following-day folder 5.

Although not shown, a mode in which the current-day folder 4 is provided with a first folder 2 and a second folder 3 and in which the following-day folder 5 is provided with a first folder 2 and a second folder 3 may be employed.

Figure 4:
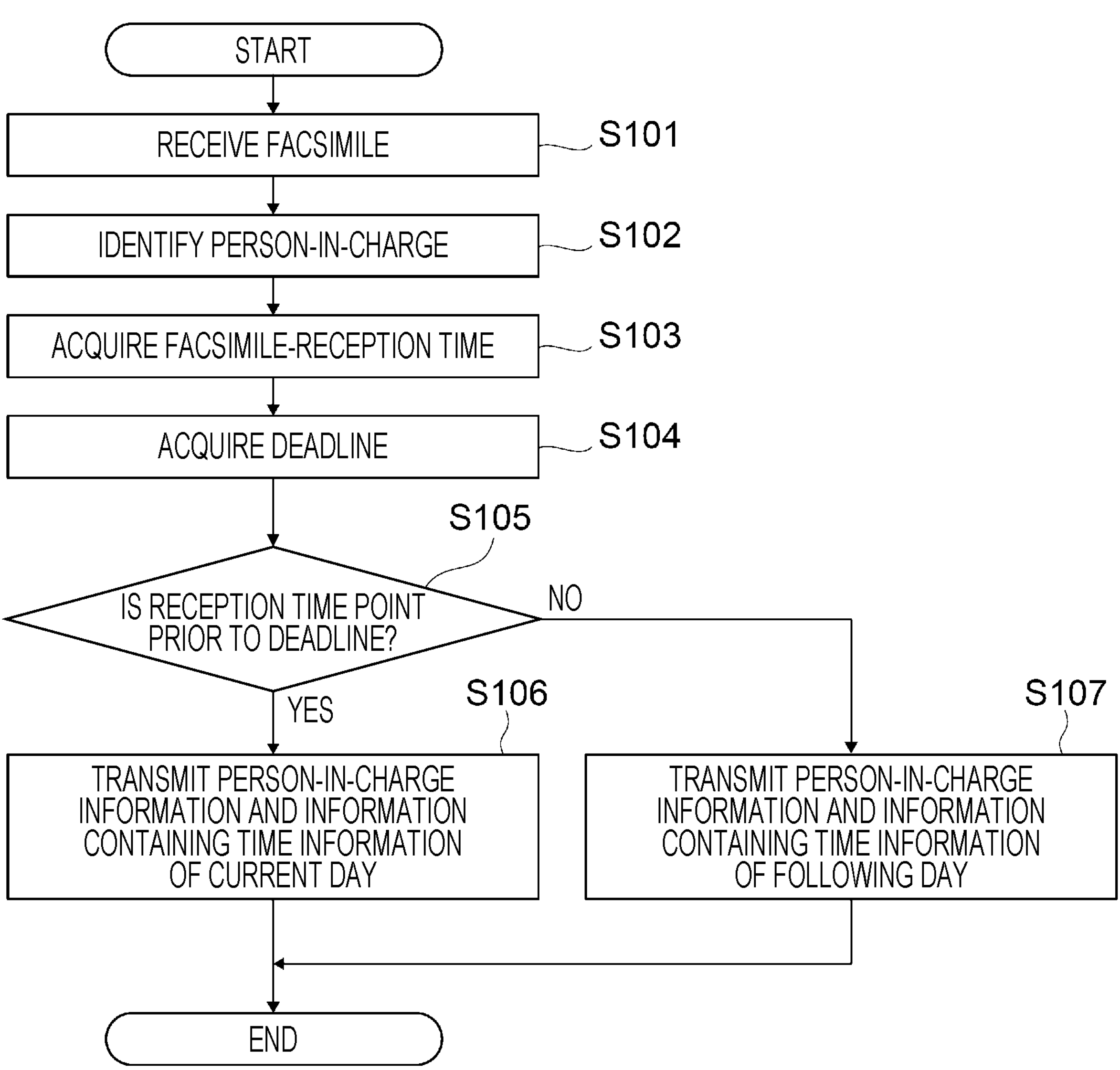
FIG. 4 is a flowchart illustrating a processing example in a central processing unit (CPU) of the information processing unit in the image forming apparatus according to an exemplary embodiment.
Figure 5:
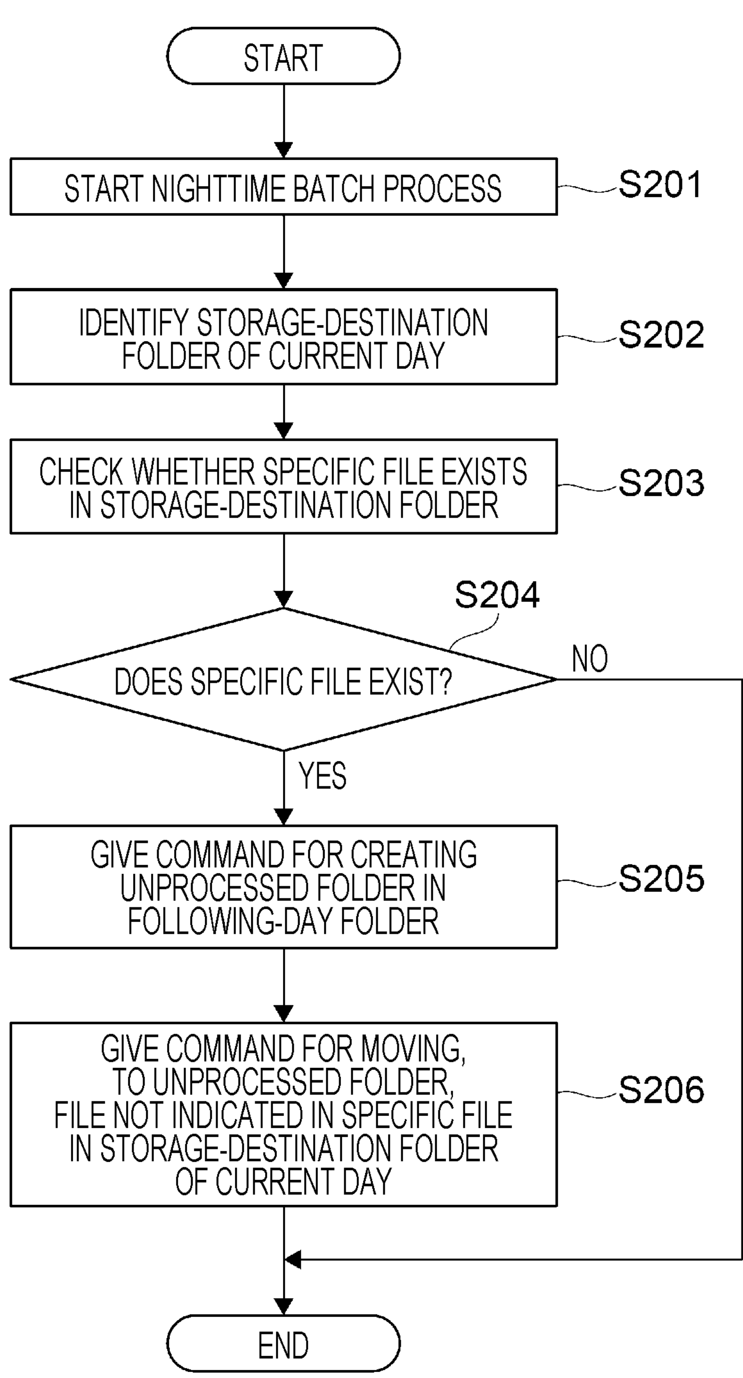
FIG. 5 is a flowchart illustrating the processing example in the CPU of the information processing unit in the image forming apparatus according to this exemplary embodiment.

FIGS. 4 and 5 are flowcharts illustrating a processing example in the CPU 11*a* (see FIG. 2) of the information processing unit 100A in the image forming apparatus 100 according to this exemplary embodiment. More specifically, FIG. 4 illustrates a case where information indicating a person-in-charge folder and a date folder as a storage location for reception image data received by facsimile is transmitted to the server apparatus 200, and FIG. 5 illustrates a case where unprocessed reception image data as reception image data already stored in the current-day folder 4 but not processable on the current day is moved to the following-day folder 5. Processed reception image data as reception image data received by facsimile and already processed on the current day is not to be moved.

In this processing example, each of the multiple persons-in-charge using the user terminal 300 is responsible for work involving performing a predetermined process on reception image data (see FIG. 1) stored in the person-in-charge folder of the person-in-charge. The reception image data assigned to the person-in-charge is stored in the date folder within the person-in-charge folder of the person-in-charge. Furthermore, the person-in-charge processes the reception image data stored in the date folder of the current day within business hours of the current day in principle.

A sorting destination as a person-in-charge folder of a person-in-charge to which newly received image data is assigned may be set based on, for example, the transmission source of the image data or information extracted from the image data, or may be assigned in sequence.

In the processing example shown in FIG. 4, if the image forming apparatus 100 receives a facsimile from the facsimile apparatus 400 (see FIG. 1) in step S101, the information acquisition unit 101 (see FIG. 3) of the CPU 11*a* stores acquired reception image data in the storage device 100B. Then, in step S102, the information acquisition unit 101 identifies a person-in-charge responsible for processing the new reception image data based on, for example, the transmission source of the image data or the information extracted from the image data.

The information acquisition unit 101 acquires time information of the current day, that is, facsimile-reception time information, serving as information indicating the date and time of the facsimile reception in step S103, and acquires deadline information in step S104.

The deadline information in this case is information input to the image forming apparatus 100 and used for sorting the reception image data in the current-day folder 4 or the following-day folder 5 as a storage location, and is preliminarily stored in the RAM 11*b* (see FIG. 2) of the information processing unit 100A.

In step S105, the information acquisition unit 101 uses the acquired facsimile-reception time information and the acquired deadline information to determine whether a reception time point based on the facsimile-reception time is prior to the deadline.

If the reception time point is prior to the deadline (Yes in step S105), the transmission control unit 102 (see FIG. 3) transmits person-in-charge information and information containing time information of the current day to the server apparatus 200 in step S106 to set the storage location for the reception image data to be transferred to the current-day folder 4 (see FIG. 3) of the identified person-in-charge.

If the reception time point is after the deadline (No in step S105), the transmission control unit 102 transmits the person-in-charge information and information containing time information of the following day to the server apparatus 200 in step S107 to set the storage location for the reception image data to the following-day folder 5 (see FIG. 3) of the identified person-in-charge.

The information transmitted in step S106 and step S107 described above may include the content of display control by the display control unit 103 (see FIG. 3).

When a certain person-in-charge is processing reception image data assigned to the person-in-charge on the current day, if the image data assigned to the person-in-charge alone is received by the image forming apparatus 100 (see FIG. 3), the reception image data is additionally stored in the current-day folder 4 (see FIG. 3) within the person-in-charge folder of the person-in-charge even if the reception image data is high in volume.

Even though the person-in-charge who has additionally stored the reception image data attempts to sequentially process the reception image data additionally stored in the current-day folder 4 within the business hours, a situation where the person-in-charge is not able to complete the process before a predetermined business end time point is assumable. Since unprocessed reception image data not processed before the end of work on the current day is to be processed on the following day, a manual operation has to be performed for moving the unprocessed reception image data from the current-day folder 4 to the following-day folder 5 in the person-in-charge folder of the person-in-charge. This operation has to be performed with care to prevent operational errors, thus involving a troublesome task and an operational load. On the other hand, processing the remaining reception image data on the current day by working overtime to avoid this troublesome task is not favorable since the workload of the person-in-charge may possibly increase.

Therefore, in a situation where a person-in-charge responsible for reception image data received and sorted by the image forming apparatus 100 (see FIG. 3) carries over unprocessed reception image data to the next business day if the number of items of unprocessed reception image data exceeds the number of items of image data processable on the current day, this exemplary embodiment facilitates the operation for easily accessing the unprocessed reception image data during work on the following day, thereby readily reducing the workload of the person-in-charge.

The server apparatus 200 is an example of a storage destination, the first folder 2, the second folder 3, the current-day folders 4, and the following-day folders 5 in the storage device 200B of the server apparatus 200 are examples of storage locations, and the folder names thereof are examples of information indicating the storage locations.

Furthermore, as an alternative to this exemplary embodiment in which the server apparatus 200 serves as a transfer destination, the storage device 100B of the image forming apparatus 100 may be set as a storage destination.

The processing example shown in FIG. 5 indicates a processing procedure of the information acquisition unit 101 (see FIG. 3) of the image forming apparatus 100 that performs control for moving unprocessed reception image data stored in the current-day folder 4 to the following-day folder 5.

In step S201, the information acquisition unit 101 (see FIG. 3) starts a nighttime batch process at a predetermined timing. As a result of starting the nighttime batch process, the reception image data not processed on the current day is moved from the current-day folder 4 to the following-day folder 5.

An example of the aforementioned predetermined timing is a designated time point during nighttime in the processing example shown in FIG. 5. The nighttime refers to any time between the end of work and the subsequent start of work by the person-in-charge T01.

Furthermore, as the predetermined timing, the process may be performed regularly at every fixed time period, such as every hour, or the process may be performed when new image data is received, that is, when a facsimile is received. The aforementioned predetermined timing is an example of a predetermined time. The predetermined time in this case refers to a time at which a temporal condition is satisfied or a time at which an event has occurred.

For example, a case where every fixed time period is set as the predetermined timing is applicable to a workplace that employs a flexible time system where each person-in-charge is allowed to select the start and end of his/her own working hours.

The nighttime batch process involves first identifying a storage-destination folder of the current day in step S202. More specifically, the current-day folder 4 (see FIG. 3) in the person-in-charge folder is identified. Then, it is checked in step S203 whether a specific file exists in the current-day folder 4. The specific file in this case is a file including information for identifying unprocessed reception image data and is created by the person-in-charge responsible for the reception image data.

This exemplary embodiment relates to an example where information indicating processed reception image data is included as the information included in the specific file. Specifically, of the reception image data in the current-day folder 4, reception image data not included in the specific file is treated as unprocessed reception image data and is to be processed.

As an alternative to the case where the specific file includes the information indicating processed reception image data, a case where the specific file includes information indicating unprocessed reception image data is also permissible, or a case where the specific file includes information indicating both processed reception image data and unprocessed reception image data in a distinguishable fashion is also permissible. Accordingly, as an alternative to the case where the setting is provided in advance, a case where reception image data includes predetermined text in a filename thereof is also conceivable.

The specific file is an example of information allowing image data transferred to a storage location to be distinguishable between unprocessed image data as image data that has not been processed and processed image data as image data that has been processed.

Instead of using the specific file, processed reception image data or unprocessed reception image data may be designated by adding a checkmark thereto.

In step S204, the information acquisition unit 101 (see FIG. 3) determines whether the existence of the specific file is confirmed. If the specific file exists (Yes in step S204), the information acquisition unit 101 first commands the server apparatus 200 to create an unprocessed folder in the following-day folder 5 in step S205. Then, in step S206, a command is given for moving, to the unprocessed folder, unprocessed reception image data, that is, a file not indicated in the specific file, among the reception image data in the current-day folder 4 serving as a storage-destination folder of the current day.

Accordingly, the person-in-charge creates the specific file in this manner so that the troublesome task for actually moving the unprocessed reception image data may be omitted, thereby suppressing operational errors.

The command given in step S206 is an example of a command for moving unprocessed image data to a second storage location. As an alternative to this exemplary embodiment in which a command is given for moving unprocessed reception image data, the command given in step S206 may be a command for moving processed reception image data or may be a command for moving unprocessed reception image data and processed reception image data to separate folders.

The command given in step S206 is an example of a command for moving at least one of unprocessed image data and processed image data to a second storage location.

Specific examples according to this exemplary embodiment will now be described with reference to FIGS. 6, 7, and 8.

Figure 6:
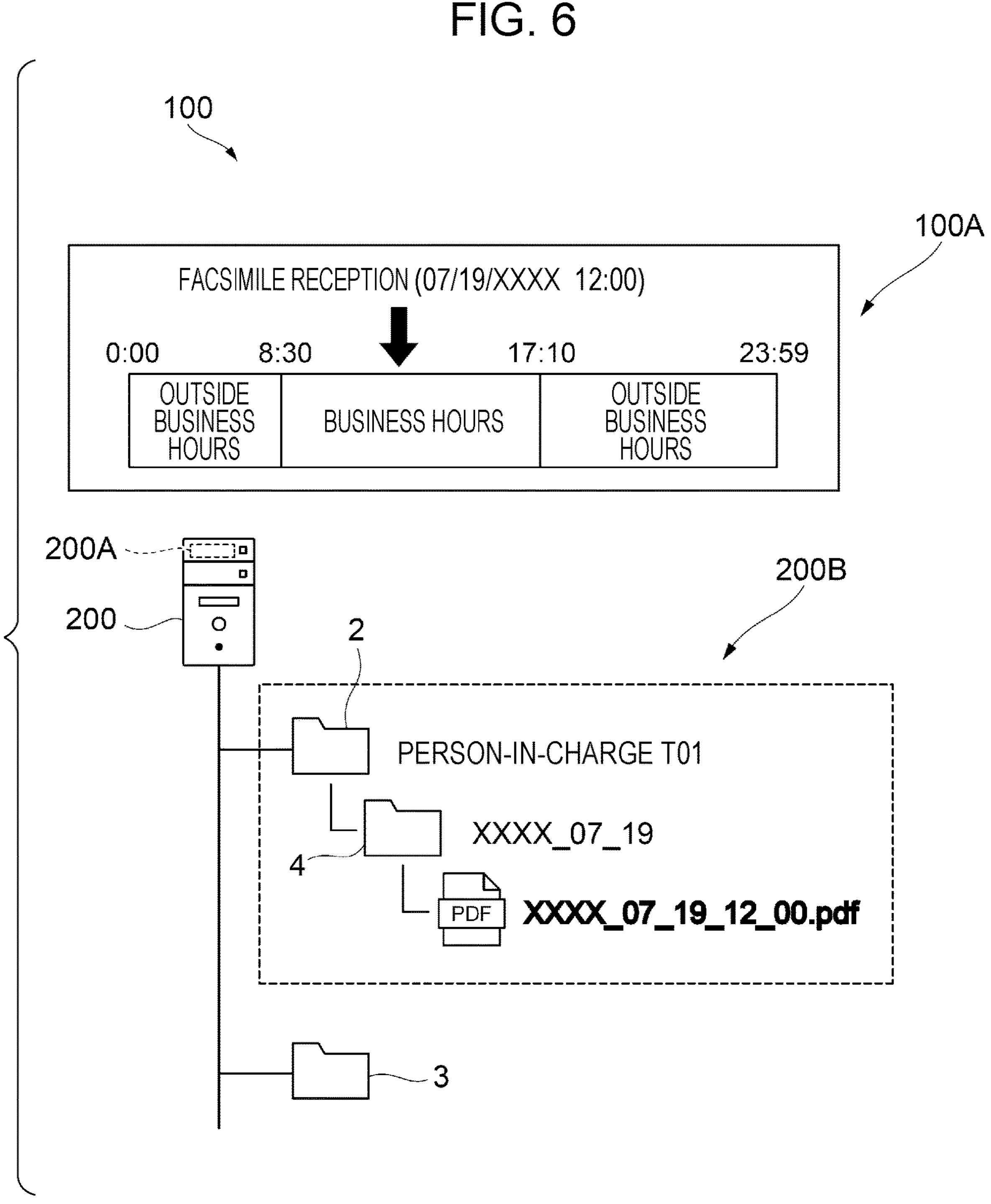
FIG. 6 illustrates a specific example according to this exemplary embodiment.
Figure 7:
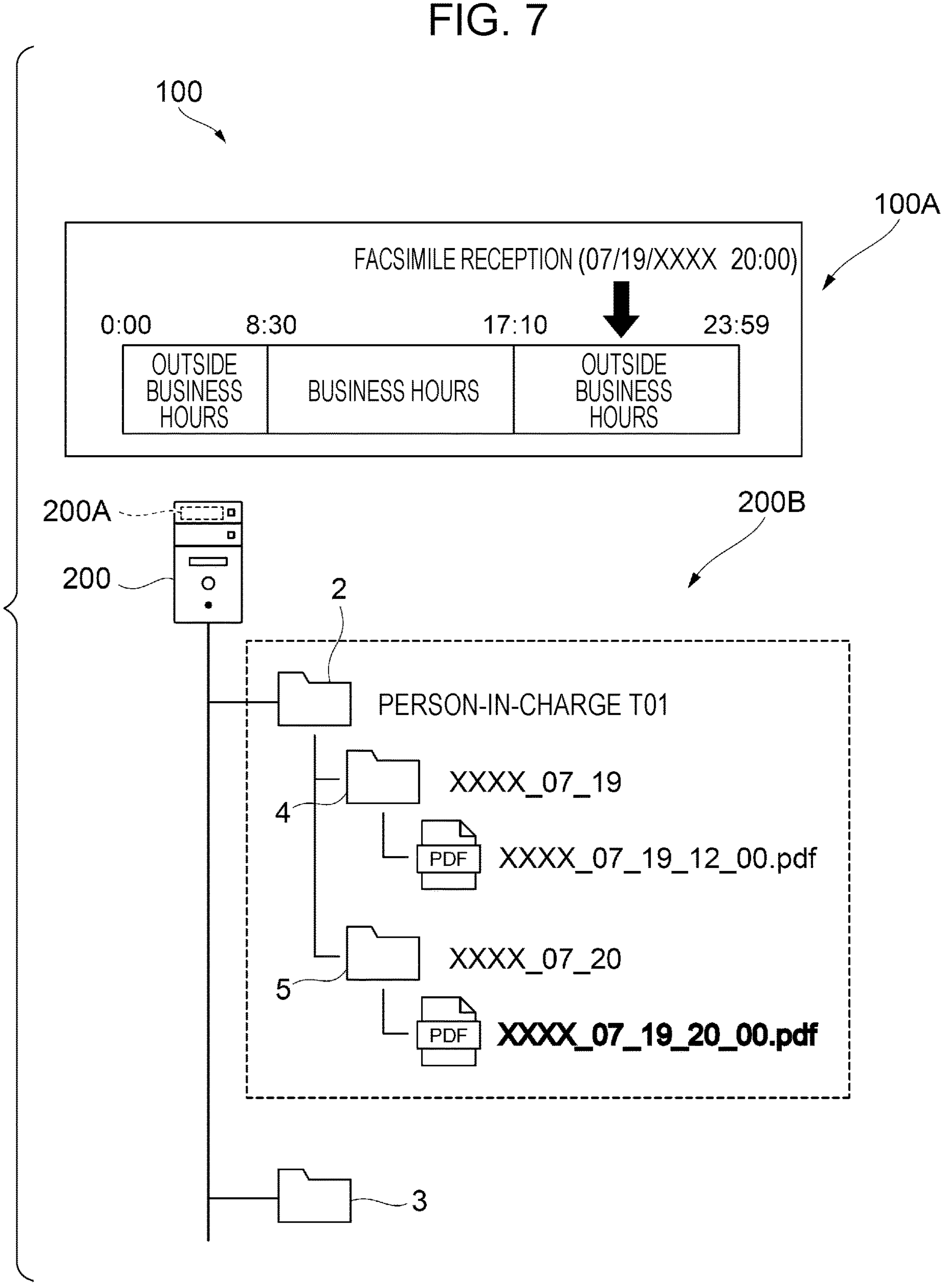
FIG. 7 illustrates a specific example according to this exemplary embodiment.
Figure 8:
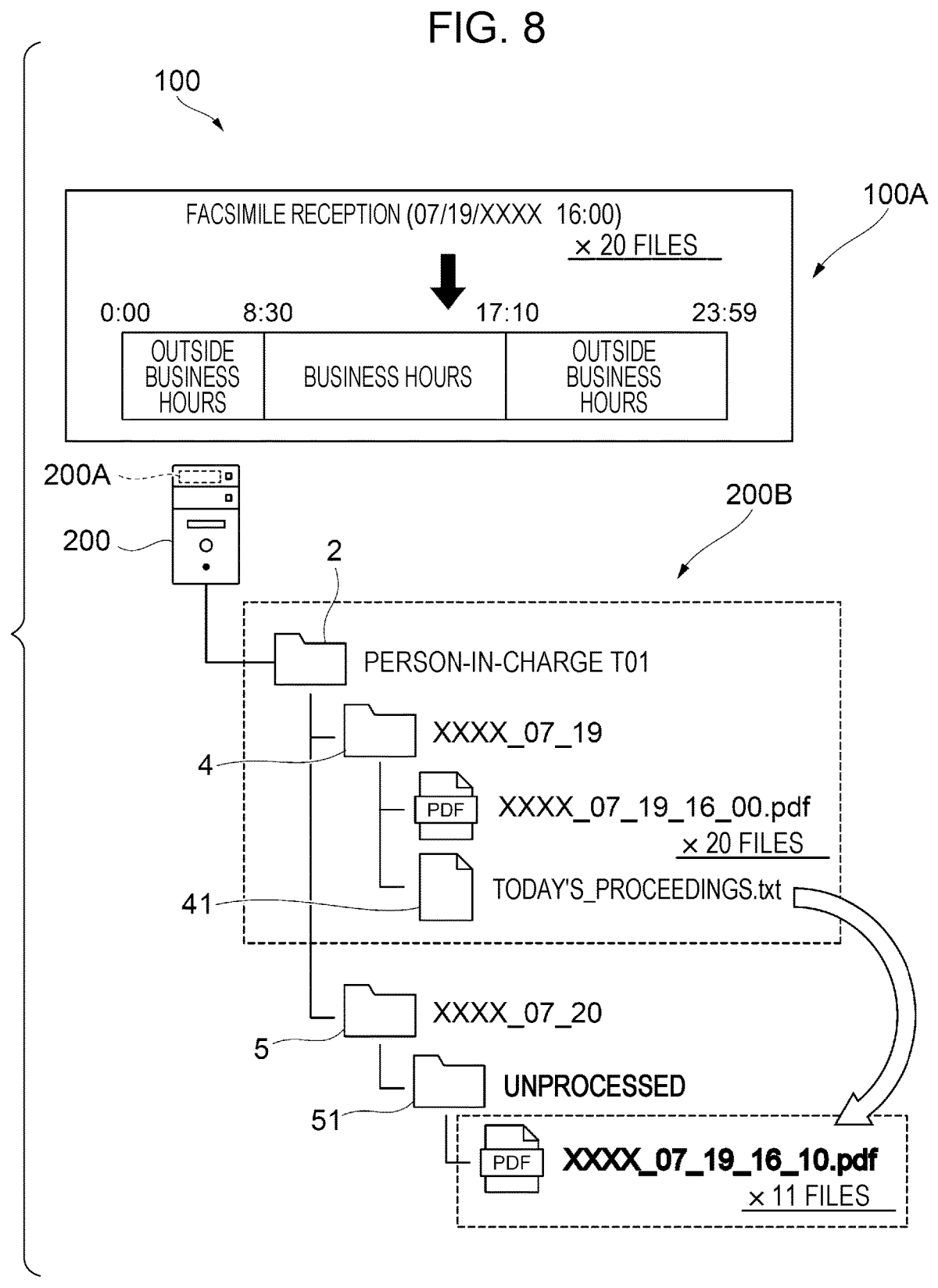

FIGS. 6 to 8 illustrate the specific examples according to this exemplary embodiment. Specifically, FIGS. 6 and 7 each illustrate the above-described process according to the flowchart shown in FIG. 4, and FIG. 8 illustrates the above-described process according to the flowchart shown in FIG. 5.

More specifically, FIG. 6 illustrates a case where reception image data received by facsimile within the business hours is assigned to the person-in-charge T01, and FIG. 7 illustrates a case where reception image data received by facsimile outside the business hours is assigned to the person-in-charge T01. FIG. 8 illustrates a case where the nighttime batch process is performed.

As shown in FIGS. 6 to 8, the business hours are from 8:30 to 17:10 in 24-hour notation.

Although FIGS. 6 to 8 are diagrams for explaining the image forming apparatus 100 and the server apparatus 200, a part indicating the file configuration within the storage device 200B of the server apparatus 200 may be regarded that the part indicates a mode of a screen displayed on the display device 310 (see FIG. 1) of the user terminal 300 from a different perspective.

In the case shown in FIG. 6, the facsimile-reception time in the image forming apparatus 100 indicates 12:00 on Jul. 19, XXXX, and the information processing unit 100A has set the first folder 2 of the person-in-charge T01 as a sorting destination for the reception image data. The reception time point is prior to the deadline (see Yes in step S105 in FIG. 4), and the current-day folder 4 is the storage location.

Therefore, when transferring the reception image data, the information acquisition unit 101 (see FIG. 3) transmits information indicating that the sorting destination is the person-in-charge T01 and information including time information of the current day to the server apparatus 200 (see step S106 in FIG. 4).

The information indicating that the sorting destination is the person-in-charge T01 is an example of information indicating a storage location.

When the server apparatus 200 receives the aforementioned information, the information processing unit 200A stores the transferred reception image data with a filename “XXXX_07_19_12_00.pdf” in a folder “XXXX_07_19” as the current-day folder 4 within the first folder 2 in the storage device 200B.

In the case shown in FIG. 7, the facsimile-reception time indicates 20:00 on Jul. 19. XXXX, and the information processing unit 100A has set the first folder 2 of the person-in-charge T01 as a sorting destination for the reception image data. The reception time point is not prior to the deadline (see No in step S105 in FIG. 4), and the following-day folder 5 is the storage location.

Therefore, when transferring the reception image data, the information acquisition unit 101 (see FIG. 3) transmits information indicating that the sorting destination is the person-in-charge T01 and information including time information of the following day to the server apparatus 200 (see step S107 in FIG. 4).

When the server apparatus 200 receives the aforementioned information, the information processing unit 200A stores the transferred reception image data with a filename “XXXX_07_19_20_00.pdf” in a folder “XXXX_07_20” as the following-day folder 5 within the first folder 2 in the storage device 200B.

In the case shown in FIG. 8, a facsimile is received at 16:00 on Jul. 19, XXXX, meaning that 1 hour and 10 minutes remain before the end of the business hours. As shown in FIG. 8, 20 files of new reception image data are received by facsimile, meaning that there are 20 items of new reception image data. The 20 files of the transferred reception image data each with a filename “XXXX_07_19_16_00.pdf” are stored in the folder “XXXX_07_19” as the current-day folder 4.

Subsequently, if the person-in-charge T01 processes nine of the 20 files before the end of the business hours, the person-in-charge T01 moves the remaining 11 files as unprocessed reception image data from the current-day folder 4 to the following-day folder 5. The following-day folder 5 is an example of a second storage location.

Therefore, the person-in-charge T01 creates a file “today's_processings.txt” as a specific file 41 (see step S203 in FIG. 5). The nine files of the processed reception image data are indicated in this specific file 41. The specific file 41 may be created by designating reception image data from a displayed list of reception image data stored in a designated folder at an operation reception unit 132 (see FIG. 1) of the image forming apparatus 100, in addition to inputting the processed reception image data in the display device 310 of the user terminal 300.

As an alternative to this exemplary embodiment in which the specific file 41 exists in the current-day folder 4 where a target object to be moved is stored, the specific file 41 may be provided at a predetermined storage location.

More specifically, the specific file 41 may be given a predetermined name and be set in advance such that reception image data stored in the specific file 41 is a target object to be moved.

When the aforementioned nighttime batch process shown in FIG. 5 is started and the existence of the file “today's_proceedings.txt” is confirmed, a folder 51 with a folder name “unprocessed” is created as an unprocessed folder in the following-day folder 5. Then, the 11 files identified as unprocessed reception image data are moved to the folder 51 (see Yes in step S204 in FIG. 5, and step S205 and step S206).

As shown in FIG. 8, the filenames of the 11 files in the folder 51 are indicated with a bold font. The display mode using such a bold font indicates that a file is to be processed on the following day instead of being processing on the current day, that is, the file is to be carried over to the following day.

The storage location for each of the 11 files in the following-day folder 5 is given a folder name different from the usual, and each filename is indicated with a bold font.

The 11 files stored in the folder 51 in the following-day folder 5 may be displayed in a mode different from the display mode for the reception image data originally stored in the following-day folder 5 of the person-in-charge T01.

As an alternative to both giving a folder name different from the usual and indicating a filename with a bold font, the different mode may involve either giving a folder name different from the usual or indicating a filename with a bold font. Furthermore, as an alternative to or in addition to giving a folder name different from the usual and indicating a filename with a bold font, the folder name or the filename may be displayed in a high-profile color, such as red. Accordingly, the person-in-charge T01 may be reminded on the following day.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

transmit information to a storage destination when received image data is transferred to the storage destination where the image data is stored, the information indicating a storage location corresponding to a person-in-charge responsible for processing the image data; and transmit a command to the storage destination if information allowing the image data transferred to the storage location to be distinguishable between unprocessed image data as image data that has not been processed and processed image data as image data that has been processed is acquired, the command indicating that at least one of the unprocessed image data and the processed image data is to be moved to a second storage location.

(((2)))

The information processing apparatus according to (((1))), wherein the information allowing the image data to be distinguishable exists at a predetermined storage location, and wherein a process of confirming that the information allowing the image data to be distinguishable exists at the predetermined storage location is performed at a predetermined time.

(((3)))

The information processing apparatus according to (((2))), wherein the predetermined time is any time between an end of work and a subsequent start of work by the person-in-charge.

(((4)))

The information processing apparatus according to (((2))), wherein the predetermined time includes every fixed time period.

(((5)))

The information processing apparatus according to (((2))), wherein the predetermined time is a time when new image data is received.

(((6)))

The information processing apparatus according to (((1))), wherein a predetermined one of the unprocessed image data and the processed image data is identified in accordance with the information allowing the image data to be distinguishable.

(((7)))

The information processing apparatus according to (((6))), wherein the information allowing the image data to be distinguishable is included in a file having a predetermined name and indicates either one of the unprocessed image data and the processed image data.

(((8)))

The information processing apparatus according to (((6))), wherein the information allowing the image data to be distinguishable indicates that the image data stored at the storage location where a file having a predetermined name exists is the unprocessed image data.

(((9)))

The information processing apparatus according to (((6))), wherein the information allowing the image data to be distinguishable is created in accordance with a designation from a displayed list of the image data stored at the storage location.

(((10)))

The information processing apparatus according to any one of (((1))) to (((9))), wherein the storage location corresponds to a date of reception of the image data, and wherein the second storage location corresponds to the person-in-charge and corresponds to any date on or after a following day of the date of reception of the image data.

(((11)))

The information processing apparatus according to any one of (((1))) to (((10))), wherein the image data stored at the second storage location is displayed in a different mode from image data received on any date on or after a following day of a date of reception of the image data.

(((12)))

A program causing an information processing apparatus to execute a process, the process comprising:

transmitting information to a storage destination when received image data is transferred to the storage destination where the image data is stored, the information indicating a storage location corresponding to a person-in-charge responsible for processing the image data; and transmitting a command to the storage destination if information allowing the image data transferred to the storage location to be distinguishable between unprocessed image data as image data that has not been processed and processed image data as image data that has been processed is acquired, the command indicating that at least one of the unprocessed image data and the processed image data is to be moved to a second storage location.

What is claimed is:

1. An information processing apparatus comprising:

a processor configured to:

transmit information to a storage destination when received image data is transferred to the storage destination where the image data is stored in a first storage location, the information indicating the first storage location corresponding to a person-in-charge responsible for processing the image data;

transmit a command to the storage destination if information allowing the image data transferred to the first storage location to be distinguishable between unprocessed image data as image data that has not been processed and processed image data as image data that has been processed is acquired, wherein the command indicates that at least one of the unprocessed image data and the processed image data is to be moved to a second storage location; and cause the at least one of the unprocessed image data and the processed image data to move from the first storage location to the second storage location according to the information allowing the image data to be distinguishable in response to the command.

2. The information processing apparatus according to claim 1, wherein the information allowing the image data to be distinguishable exists at a predetermined storage location, and wherein a process of confirming that the information allowing the image data to be distinguishable exists at the predetermined storage location is performed at a predetermined time.

3. The information processing apparatus according to claim 2, wherein the predetermined time is any time between an end of work and a subsequent start of work by the person-in-charge.

4. The information processing apparatus according to claim 2, wherein the predetermined time includes every fixed time period.

5. The information processing apparatus according to claim 2, wherein the predetermined time is a time when new image data is received.

6. The information processing apparatus according to claim 1, wherein a predetermined one of the unprocessed image data and the processed image data is identified in accordance with the information allowing the image data to be distinguishable.

7. The information processing apparatus according to claim 6, wherein the information allowing the image data to be distinguishable is included in a file having a predetermined name and indicates either one of the unprocessed image data and the processed image data.

8. The information processing apparatus according to claim 6, wherein the information allowing the image data to be distinguishable indicates that the image data stored at the storage location where a file having a predetermined name exists is the unprocessed image data.

9. The information processing apparatus according to claim 6, wherein the information allowing the image data to be distinguishable is created in accordance with a designation from a displayed list of the image data stored at the storage location.

10. The information processing apparatus according to claim 1, wherein the storage location corresponds to a date of reception of the image data, and wherein the second storage location corresponds to the person-in-charge and corresponds to any date on or after a following day of the date of reception of the image data.

11. The information processing apparatus according to claim 1, wherein the image data stored at the second storage location is displayed in a different mode from image data received on any date on or after a following day of a date of reception of the image data.

12. A non-transitory computer readable medium storing a program causing an information processing apparatus to execute a process, the process comprising:

transmitting information to a storage destination when received image data is transferred to the storage destination where the image data is stored in a first storage location, the information indicating the first storage location corresponding to a person-in-charge responsible for processing the image data;

transmitting a command to the storage destination if information allowing the image data transferred to the first storage location to be distinguishable between unprocessed image data as image data that has not been processed and processed image data as image data that has been processed is acquired, wherein the command indicates that at least one of the unprocessed image data and the processed image data is to be moved to a second storage location; and causing the at least one of the unprocessed image data and the processed image data to move from the first storage location to the second storage location according to the information allowing the image data to be distinguishable in response to the command.

13. An information processing method comprising:

transmitting information to a storage destination when received image data is transferred to the storage destination where the image data is stored in a first storage location, the information indicating the first storage location corresponding to a person-in-charge responsible for processing the image data;

transmitting a command to the storage destination if information allowing the image data transferred to the first storage location to be distinguishable between unprocessed image data as image data that has not been processed and processed image data as image data that has been processed is acquired, wherein the command indicates that at least one of the unprocessed image data and the processed image data is to be moved to a second storage location;

causing the at least one of the unprocessed image data and the processed image data to move from the first storage location to the second storage location according to the information allowing the image data to be distinguishable in response to the command.

* * * * *